UNITED STATES PATENT OFFICE.

WILLIAM ARCHDEACON, OF CHICAGO, ILLINOIS.

COMPOUND FOR CURING AND PRESERVING MEATS.

SPECIFICATION forming part of Letters Patent No. 234,844, dated November 30, 1880.

Application filed February 26, 1880.

*To all whom it may concern:*

Be it known that I, WILLIAM ARCHDEACON, of the city of Chicago, county of Cook, and State of Illinois, have invented certain new and useful Improvements in Compounds for Curing and Preserving Meats, of which the following is a specification.

The object of my invention is to attain the same result with meats, fish, and like substances by the use of a single compound that is ordinarily reached by the two processes of salting and smoking, and at the same time to more effectually preserve the meat from tainting than has been usual heretofore. The objects are accomplished by the use of certain articles compounded and applied substantially as hereinafter set forth.

I first take a quantity of common salt and preferably dry it thoroughly by heating. Then, while the salt is yet warm, I add pyroligneous acid in about the proportion of two and a half pounds of acid to each one hundred pounds of salt. When these substances are well mixed I add salicylic acid in about the proportion of four ounces to the above specified quantities of other articles. When the ingredients are thoroughly compounded and have become a homogeneous mass, and the compound has become cold, the usual or any approved method of salting meats is followed, (except that this compound is used instead of clear salt,) and it will be found, after the proper time has elapsed, that the meat is to all appearances in the same condition which has heretofore been attained by the double process of salting and smoking, and in addition will keep sweet much longer than if it had been so treated.

The object of my invention might be measurably attained by the use of salt and pyroligneous acid alone, the salicylic acid being used only as an antiseptic; but as when meat is to be kept a long time the use of enough salt to insure its preservation renders it unpalatable to most persons, I regard the use of all the ingredients named as of importance.

I am aware that compounds involving substantially the use of salt and either of the two acids have been used in the preservation of articles of food, and I therefore do not claim other than the complete compound.

The proportions above given may, of course, be varied according to the effect desired to be produced, and therefore I do not desire to confine myself in this particular, but may vary the amounts of the several ingredients used at pleasure.

Having thus fully described my said invention, what I claim as new, and desire to secure by Letters Patent, is—

The above-described compound of salt, pyroligneous acid, and salicylic acid, as and for the purposes set forth.

In witness whereof I have hereunto set my hand and seal at Indianapolis, Indiana, this 23d day of February, A. D. 1880.

WM. ARCHDEACON. [L. S.]

In presence of—
 C. BRADFORD,
 M. J. MURPHY.